US009888826B2

(12) United States Patent
Zhou

(10) Patent No.: US 9,888,826 B2
(45) Date of Patent: Feb. 13, 2018

(54) ENVIRONMENT-PROTECTION ENERGY-SAVING BARREL

(71) Applicant: Zhongjie Zhou, Guangdong (CN)

(72) Inventor: Zhongjie Zhou, Guangdong (CN)

( * ) Notice: Subject to any disclaimer, the term of this patent is extended or adjusted under 35 U.S.C. 154(b) by 167 days.

(21) Appl. No.: 14/420,893

(22) PCT Filed: May 9, 2014

(86) PCT No.: PCT/CN2014/077111
§ 371 (c)(1),
(2) Date: Feb. 10, 2015

(87) PCT Pub. No.: WO2014/180341
PCT Pub. Date: Nov. 13, 2014

(65) Prior Publication Data
US 2016/0051118 A1    Feb. 25, 2016

(30) Foreign Application Priority Data
May 10, 2013   (CN) .......................... 2013 1 0171088

(51) Int. Cl.
*A47L 13/58*   (2006.01)
*A47L 13/59*   (2006.01)
*A47J 47/18*   (2006.01)

(52) U.S. Cl.
CPC ............... *A47L 13/58* (2013.01); *A47L 13/59* (2013.01); *A47J 47/18* (2013.01)

(58) Field of Classification Search
CPC ............ A47J 47/18; A47L 13/58; A47L 13/59

USPC ............................................. 15/261; 141/363
See application file for complete search history.

(56) References Cited

U.S. PATENT DOCUMENTS

| | | | | |
|---|---|---|---|---|
| 3,045,252 A * | 7/1962 | Sorrells | ................... | A47L 13/50 4/626 |
| 7,437,795 B1 * | 10/2008 | Bez | ......................... | A47L 13/59 15/260 |
| 2014/0263105 A1 * | 9/2014 | Kontorovich | ........... | A47L 13/59 210/791 |

FOREIGN PATENT DOCUMENTS

EP          2449941 A2 *   5/2012   ............ A47L 13/59

* cited by examiner

*Primary Examiner* — Terry K Cecil
(74) *Attorney, Agent, or Firm* — Global IP Services; Tianhua Gu

(57) ABSTRACT

An environment-protection energy-saving barrel is an integral formed by three parts, i.e. an outer barrel, a middle barrel and an inner barrel. The inner barrel is communicated with the middle barrel; the bottom of the middle barrel is provided with a water inlet pipeline; the water inlet pipeline is communicated with the bottom of the outer barrel used for storing water; a water inlet quantity controller is arranged on the water inlet pipeline; the inner barrel communicated with the middle barrel is used for dewatering and cleaning a mop; and the water inlet quantity controller arranged on the water inlet pipeline is used for controlling the water inlet quantity which flows into the middle barrel from the outer barrel and controlling the on/off of a valve of the water inlet pipeline. Therefore the water in the barrel can be repeatedly used.

5 Claims, 1 Drawing Sheet

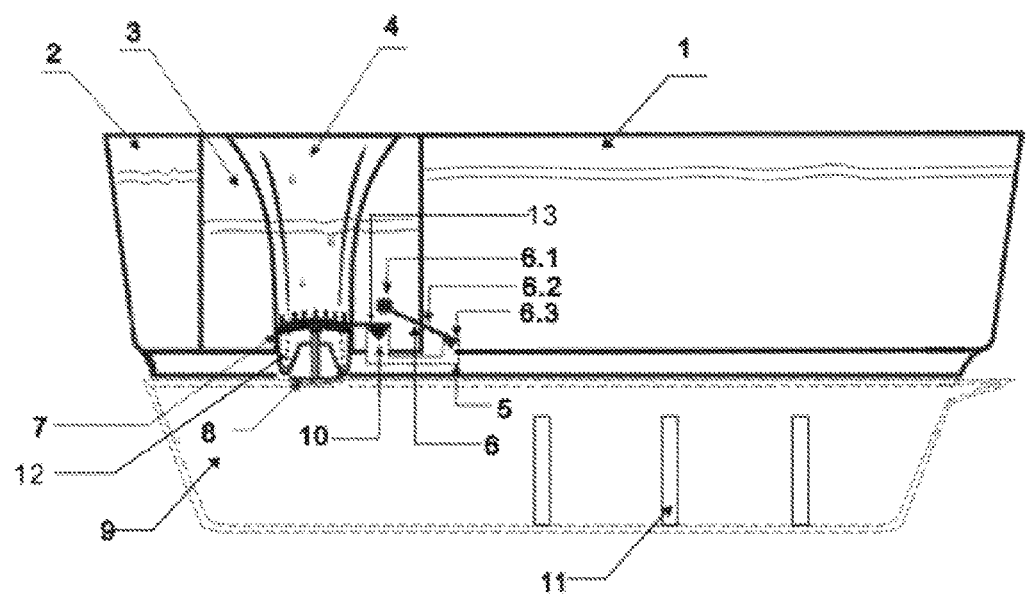

ENVIRONMENT-PROTECTION ENERGY-SAVING BARREL

CROSS REFERENCE TO RELATED PATENT APPLICATION

The present application is the US national stage of PCT/CN2014/077111 filed on May 9, 2014, which claims the priorities of the Chinese patent applications No. 201310171088.9 filed on May 10, 2013, which application is incorporated herein by reference.

TECHNICAL FIELD

The present invention relates to a cleaning tool in daily life, and in particular, to an environment-protection energy-saving barrel.

BACKGROUND

For a long time, when mopping floors with a mop barrel, only the water for cleaning the mop at the first time is clean as long as the water in the barrel is unchanged; thereafter, the more the mop is washed, the dirtier the floor is. Every time the water in the original barrel is used for washing, and it is finally found that the mop is cleaned with the sewage all the time when mopping the floor. It apparently seems that the floor has been mopped, but actually, the floor is not clean at all. This is because the water for mopping the floor is unchanged. The water has a lot of dust, sand and other dirt due to cleaning the mop for many times.

Chinese patent public document 1 (publication No. 201445499U) discloses a mop barrel, which consists of a barrel body and a dewatering basket, wherein the interior of the barrel body is connected with the dewatering basket, the dewatering basket is connected with a pedal linkage device through a rotation shaft, the edge at the upper part of the barrel body is connected with a lifting handle through a lifting handle shaft, and the lifting handle is connected in a sliding manner with the barrel body in a sliding groove through a supporting shaft and a sliding shaft at one end of a supporting rod; the upper part of the dewatering basket is connected with two semicircular fasteners, i.e. a left fastener and a right fastener, the left fastener and the right fastener are connected with the dewatering basket through a rotating shaft, and the two fasteners can rotate upwards to be combined and connected and rotate downwards to be respectively superposed with the basket opening of the dewatering basket; and the pedal linkage device is made up in a manner that a foot board and a shaft arm are in rotational connection through an arm shaft, and the shaft arm is connected in a sliding manner with a rectangular sliding tooth block through a spring in a sliding fixing seat, so as to drive a gearwheel, a medium gear, and a pinion wheel to rotate in sequence.

The dewatering basket in the above-mentioned public document 1 plays a main role of dewatering and cleaning dirt, but the structure thereof is very complicated, and long-term use is likely to cause damage and loss of the link mechanism, which is very difficult to maintain for a person not skilled in the art, and the manufacturing cost is higher, which is unacceptable for ordinary people.

Chinese patent public document 2 (publication No. 201701177U) discloses a mop barrel which is easy to drain sewage and dirt. The mop barrel comprising a mop barrel body, wherein the bottom surface of the mop barrel body inclines downwards; and the lowest position of the bottom surface is provided with a drain pipe. When in draining sewage, the utility model can drain the sewage, dirt and sediments outside at one time, so that the trouble of cleaning the mop barrel is avoided, and the burden of a housework laborer is lightened.

The above-mentioned public document 2 discloses the mop barrel which is easy to drain sewage. However, in the event of mopping the floor, the sewage in the barrel can only be emptied at one time and then clean water is poured into the barrel for water change, which fails to change the condition of mopping the floor with the sewage.

In summary, the floor is often mopped with the sewage except for dewatering for the first time after changing the water when the mop barrel in the prior is used for mopping the floor.

SUMMARY OF THE INVENTION

The present invention aims at providing an environment-protection energy-saving barrel, so as to ensure the water for cleaning a mop is clean each time when mopping the floors.

The above-mentioned object of the present invention is realized by the following technical scheme.

An environment-protection energy-saving barrel is characterized by including a barrel body. The barrel body is an integral whole formed by an outer barrel, a middle barrel and an inner barrel. The inner barrel is communicated with the middle barrel. The bottom of the middle barrel is provided with a water inlet pipeline. The water inlet pipeline is communicated with the bottom of the outer barrel used for storing water. A water inlet quantity controller is arranged on the water inlet pipeline. The inner barrel communicated with the middle barrel is used for dewatering and cleaning a mop. The water inlet quantity controller arranged on the water inlet pipeline is used for controlling the water inlet quantity which flows into the middle barrel from the outer barrel and controlling the on/off of a valve of the water inlet pipeline.

The water inlet controller consists of a floater, a water quantity regulating rod and a water outlet valve switch. The floater is arranged at one end of the water quantity regulating rod, and the water outlet valve switch arranged at the other end thereof is located at the end port portion of the water inlet pipeline. The water quantity regulating rod passes through the wall between the middle barrel and the outer barrel. The floater is arranged in the middle barrel. The water quantity regulating rod, the floater and the water outlet valve switch ensure that the water outlet of the water inlet pipeline in the outer barrel is only opened and closed by the water inlet pipeline connecting the outer barrel with the middle barrel according to the water level in the middle barrel, which mainly functions in forming a basic model of a lever principle among the water quantity regulating rod, the floater and the water outlet valve, the wall between the outer barrel and the middle barrel is used as a supporting point, the water quantity regulating rod is used as a seesaw, the floater and the water outlet valve switch at both ends of the water quantity regulating rod are interacted with each other, the floater is stressed by a buoyancy force and the water outlet valve switch is stressed by gravity. When the water level is lower than the horizontal position of the floater, the floater declines, the water outlet valve switch raises up, and the water outlet of the water pipeline in the outer barrel is opened; and when the water level is higher than the horizontal position of the floater, the water outlet of the water pipeline in the outer barrel is closed.

The bottom of the barrel body is provided with a filtering barrel, which is mainly used for filtering dust and particles, etc. in the sewage after dewatering the mop.

The filtering barrel is internally provided with a plurality of clapboards, which are similar to filtering systems of a septic tank for depositing and filtering.

The bottom of the inner barrel is provided with a dewatering pressing plate. The dewatering pressing plat is connected with a drain valve and plays a role in helping a user dewatering the mop.

A cover plate (12) is fixed at the outer edge of the dewatering pressing plate. The end portion of the cover plate (12) is made into a water inlet valve (10). The water inlet valve (10) is located above the end port portion of the water inlet pipeline (6) in the middle barrel and remains a certain gap from the end port.

The drain valve is connected with the filtering barrel.

The bottom of the inner barrel is provided with the drain valve. The drain valve consists of a valve and a reset spring. The valve is connected with the dewatering pressing plate, and the lower end of the valve is connected with the spring. When a user puts the mop onto the dewatering pressing plate and presses it with force to dry, the valve is opened, and the sewage caused by dewatering the mop is discharged into the filtering barrel via the drain valve.

BENEFICIAL EFFECTS

According to the environment-protection energy-saving barrel, water in the barrel can be repeatedly used, and water for cleaning the mop is clean each time. Particularly, since the environment-protection energy-saving barrel is provided with the bottom barrel having the multi-stage filtering function, the water in the barrel is recycled, and the barrel is energy-saving and environment-protection. And moreover, the environment-protection energy-saving barrel is in a simple and useful structure, is convenient to repair, and has an extremely high market promoting value.

BRIEF DESCRIPTION OF THE DRAWINGS

The specific embodiment of the environment-protection energy-saving barrel according to the present invention will be described in details hereinafter with reference to the accompanying drawings, and further, the above-mentioned technical scheme will be described in details.

FIG. 1 is a schematic structural diagram of a specific embodiment of an environment-protection energy-saving barrel according to the present invention.

1—barrel body; 2—outer barrel; 3—middle barrel; 4—inner barrel; 5—water inlet pipeline; 6—water inlet quantity controller; 7—dewatering pressing plate; 8—drain valve; 9—filtering barrel; 10—water inlet valve; 11—clapboard; 12—cover plate; 13—reset spring 6.1—floater; 6.2—water quantity regulating rod; 6.3—water outlet valve switch

DETAILED DESCRIPTION OF PREFERRED EMBODIMENTS

As shown in FIG. 1, an environment-protection energy-saving barrel according to an embodiment of the present invention includes a barrel body, wherein the barrel body (1) includes three parts, i.e., an outer barrel (2), a middle barrel (3) and an inner barrel (4). The inner barrel (4) is communicated with the middle barrel (3) through a plurality of through holes in the wall between the inner barrel and the middle barrel. The bottom of the middle barrel is provided with a water inlet pipeline (5). The water inlet pipeline is communicated with the bottom of the outer barrel for storing water. One end of the outer barrel is provided with a water inlet quality controller (6) for the water inlet pipeline. The water inlet quantity controller (6) consists of a floater (6.1), a water quantity regulating rod (6.2) and a water outlet valve switch (6.3).

The floater (6.1) is arranged at one end of the water quantity regulating rod (6.2), and the water outlet valve switch (6.3) arranged at the other end thereof is located at the end port portion of the water inlet pipeline (5). The water quantity regulating rod passes through the wall between the middle barrel and the outer barrel. The floater (6.1) is arranged in the middle barrel (3) and the water outlet valve switch (6.3) is arranged in the outer barrel.

The bottom of the barrel body (1) is provided with a filtering barrel (9). The filtering barrel is internally provided with a plurality of clapboards (11) for depositing and filtering.

The bottom of the inner barrel is provided with a drain valve (8). The drain valve (8) is communicated with the filtering barrel. The bottom of the inner barrel is further provided with a dewatering pressing plate (7). The dewatering pressing plate (7) is connected with the drain valve (8) into a whole to drain the whole sewage into the filtering barrel, and thus keeping the water in the water barrel clean. The bottom of the inner barrel is provided with a reset spring (13). The other end of the reset spring comes into contact with the lower end of the dewatering pressing plate (7).

A cover plate (12) is fixed at the outer edge of the dewatering pressing plate (7). The end portion of the cover plate (12) is made into a water inlet valve (10). The water inlet valve (10) is located above the end port portion of the water inlet pipeline (5) in the middle barrel and remains a certain gap from the end port.

The operating principle of the environment-protection energy-saving barrel in the above-mentioned embodiment is as follows: the environment-protection energy-saving barrel is designed to consist of three parts, namely an outer barrel, a middle barrel and an inner barrel which form into a whole, wherein as a plurality holes are opened in the wall between the middle barrel and the inner barrel, the water in the middle barrel is communicated with the water in the inner barrel. The water source accesses into the middle barrel from the outer barrel via the water inlet pipeline (5) between the outer barrel and the middle barrel. A mop is cleaned in the inner barrel each time, and the water in the middle barrel is separated from the water in the outer barrel via the wall, so the sewage caused by cleaning the mop fails to reflow into the outer barrel.

When needing to dewater the mop, the user just only hold the handle of the mop, dewatering the mop and pressing the dewatering pressing plate (7) in the inner barrel with force, and then dewater the mop; and meanwhile, the drain valve (8) connected with the dewatering pressing plate (7) in a whole in the inner barrel is opened and the reset spring (13) is compressed. At this time, the sewage in the inner barrel flows into the filtering barrel (9) via the drain valve (8).

The cover plate (12) is fixedly connected with the dewatering pressing plate (7). The cover plate (12) falls down following the opening of the drain valve (8) due to pushing-down of the dewatering pressing plate. The water inlet valve (10) at the end part thereof closes a gap with the end port of the water inlet pipeline (5) to close the water inlet pipeline (5) while drawing the sewage as well, so the sewage is not reflowed into the outer barrel and the clean water in the outer barrel does not access into the middle barrel and the inner barrel.

After the mop is dewatered, the drain valve (8) is reset to close the inner barrel (4) by virtue of the resilience force of the reset spring (13) in case of lifting the mop to mop the floor. At the same time, the gap between the water inlet valve (10) and the end port of the water inlet pipeline (5) is recovered by the cover plate (12) along with the rise of the dewatering pressing plate (7), and then the water inlet valve (10) of the water inlet pipeline is opened.

By this time, the water in the middle barrel and the inner barrel has been discharged into the filtering barrel; the water level in the inner barrel is lower than the floater (6.1) of the water inlet quantity controller, the floater drops down to the cover plate (12), the water outlet valve (6.3) is separated from the end port of the water inlet pipeline (5) located below the water inlet valve (6.3) to communicate the outer barrel (2) and the middle barrel (3), the clean water in the outer barrel (2) re-accesses into the middle barrel again via the water inlet pipeline (%), and thus re-cleaning the mop with the clean water in the inner barrel when mopping the floor.

The frequency of the use of the clean water is determined by the volume of the outer barrel. The greater the volume is, the more the using time is.

The water inlet quantity from the outer barrel (2) to the middle barrel (3) is regulated by the water inlet quantity controller (6). The water inlet quantity each time is controlled by controlling the length of the water quantity regulating rod at one end of the floater. The longer the water quantity regulating rod at one end of the floater is than that at the other end, the smaller the water inlet quantity is.

The environment-protection energy-saving barrel according to the embodiment is fully made of engineering plastics, which is durable, environment-protection and energy-saving. In addition, the filtering barrel is provided with the plurality of clapboards for depositing and filtering. The sewage on the mop is seemed to be darker due to much dust and other micro-particles. The clapboards are used for depositing and filtering, so the vast majority of micro-particles are deposited at the bottom of the filtering barrel. Its principle is as bellows: the micro-particles in the still water will continue to sink to the bottom of the filtering barrel, while the filtering barrel is divided into 4 portions by the clapboards: the water in the first portion is not filtered, the water in the second portion is filtered once, the water in the third portion is filtered twice, and the water in the fourth portion is filtered three times, so the sewage after filtering several times can be reused, thus saving a lot of living water and being very environmentally friendly.

What is claimed is:

1. An environment-protection energy-saving barrel, comprising a barrel body, wherein the barrel body (1) consists of three parts, i.e. an outer barrel (2), a middle barrel (3) and an inner barrel (4) which form into a whole; the inner barrel (4) is communicated with the middle barrel (3); a bottom of the middle barrel (3) is provided with a water inlet pipeline (5); the water inlet pipeline (5) is communicated with a bottom of the outer barrel (2); a water inlet quantity controller (6) is arranged on the water inlet pipeline (5); a bottom of the inner barrel (4) is provided with a drain valve (8) and a reset spring (13); one end of the reset spring (13) comes into contact with a dewatering pressing plate (7); the bottom of the inner barrel (4) is provided with the dewatering pressing plate (7); the dewatering pressing plate (7) is connected with the drain valve (8); a cover plate (12) is fixed at an outer edge of the dewatering pressing plate (7); a water inlet valve (10) at an end part of the cover plate (12) is located above an end port portion of the water inlet pipeline (5) in the middle barrel, and a gap is arranged between the water inlet valve and the end port portion of the water inlet pipeline (5).

2. The environment-protection energy-saving barrel according to claim 1, wherein the water inlet quantity controller (6) consists of a floater (6.1), a water quantity regulating rod (6.2) and a water outlet valve switch (6.3); the floater (6.1) is arranged at one end of the water quantity regulating rod (6.2), and the water outlet valve switch (6.3) arranged at the other end thereof is located at the end port portion of the water inlet pipeline (5); the water quantity regulating rod (6.2) passes through a wall between the middle barrel (3) and the inner barrel (4), and the floater (6.1) is arranged in the middle barrel (3).

3. The environment-protection energy-saving barrel according to claim 1, wherein a bottom of the barrel body (1) is provided with a filtering barrel (9).

4. The environment-protection energy-saving barrel according to claim 3, wherein the filtering barrel (9) is internally provided with a plurality of clapboards (11).

5. The environment-protection energy-saving barrel according to claim 3, wherein the drain valve (8) is connected with the filtering barrel (9).

* * * * *